(12) United States Patent
Tarnava et al.

(10) Patent No.: US 11,407,575 B2
(45) Date of Patent: Aug. 9, 2022

(54) CONTAINERS FOR PRESSURIZING A LIQUID AND METHODS OF USE THEREOF

(71) Applicant: H2 Water Technologies Ltd., Vancouver (CA)

(72) Inventors: Alexander Tarnava, Coquitlam (CA); Bradley Humble, Burnaby (CA)

(73) Assignee: H2 Water Technologies Ltd., Vancouver (CA)

( * ) Notice: Subject to any disclaimer, the term of this patent is extended or adjusted under 35 U.S.C. 154(b) by 102 days.

(21) Appl. No.: 16/642,944

(22) PCT Filed: Sep. 4, 2018

(86) PCT No.: PCT/CA2018/051061
§ 371 (c)(1),
(2) Date: Feb. 28, 2020

(87) PCT Pub. No.: WO2019/041052
PCT Pub. Date: Mar. 7, 2019

(65) Prior Publication Data
US 2020/0346836 A1    Nov. 5, 2020

Related U.S. Application Data

(60) Provisional application No. 62/553,404, filed on Sep. 1, 2017.

(51) Int. Cl.
*B65D 81/20* (2006.01)
*A23L 2/54* (2006.01)
(Continued)

(52) U.S. Cl.
CPC ............ *B65D 81/2053* (2013.01); *A23L 2/40* (2013.01); *A23L 2/54* (2013.01); *B01F 23/23* (2022.01); *B01F 23/50* (2022.01); *B01F 33/40* (2022.01); *B01F 35/754251* (2022.01); *B65D 81/3255* (2013.01); *B65D 85/72* (2013.01);
(Continued)

(58) Field of Classification Search
CPC ......... A23L 2/40; A23L 2/54; A23V 2002/00; B01F 3/04099; B01F 3/04787; B01F 3/12; B01F 13/02; B01F 15/02; B01F 15/0279; B01F 2003/04822; B01F 2003/04843; B01F 2003/04914; B01F 23/23; B01F 23/50; B01F 33/40; B01F 35/754251; B65D 81/20; B65D 81/2053; B65D 81/32;
(Continued)

(56) References Cited

U.S. PATENT DOCUMENTS 6,994,227 B2    2/2006  Kwon
9,144,581 B2    9/2015  Miljkovic
(Continued)

OTHER PUBLICATIONS

International Search Report and Written Opinion for International Application No. PCT/CA2018/051061, dated Nov. 30, 2018 (9 pages).

*Primary Examiner* — Bryon P Gehman
(74) *Attorney, Agent, or Firm* — Clark & Elbing LLP (57) ABSTRACT

The invention provides containers for pressuring an aqueous liquid with a gas to increase the concentration of the gas in the aqueous liquid. The container employs one or more moveable sections to reduce the accessible volume of the container, e.g., allowing gases such as H2 to become supersaturated within an aqueous liquid.

15 Claims, 5 Drawing Sheets

(51) Int. Cl.

| | |
|---|---|
| *B65D 85/72* | (2006.01) |
| *B65D 81/32* | (2006.01) |
| *A23L 2/40* | (2006.01) |
| *B01F 23/23* | (2022.01) |
| *B01F 23/50* | (2022.01) |
| *B01F 33/40* | (2022.01) |
| *B01F 35/75* | (2022.01) |
| *B67D 1/00* | (2006.01) |
| *B67D 1/08* | (2006.01) |
| *B01F 23/236* | (2022.01) |
| *B01F 23/237* | (2022.01) |

(52) U.S. Cl.
CPC ......... *A23V 2002/00* (2013.01); *B01F 23/236* (2022.01); *B01F 23/237* (2022.01); *B01F 23/2364* (2022.01); *B01F 23/23764* (2022.01); *B67D 2001/0098* (2013.01); *B67D 2001/0821* (2013.01)

(58) Field of Classification Search
CPC ................ B65D 81/3255; B65D 85/72; B67D 2001/0098; B67D 2001/0821
USPC ............................................................ 141/4
See application file for complete search history.

(56) References Cited

U.S. PATENT DOCUMENTS

| | | | |
|---|---|---|---|
| 9,958,067 B2* | 5/2018 | Strong | ..................... F16J 1/003 |
| 10,744,265 B2* | 8/2020 | Egeland | ............... A61M 5/2459 |
| 2004/0067394 A1 | 4/2004 | Sadamoto et al. | |
| 2007/0287965 A1 | 12/2007 | Strong et al. | |
| 2013/0255830 A1 | 10/2013 | Im et al. | |
| 2019/0166885 A1 | 6/2019 | Tarnava et al. | |
| 2019/0290682 A1 | 9/2019 | Tarnava et al. | |

* cited by examiner

Liquid permeable membrane

*(side view)*

B)

Frame

Insert

Exterior of container

*(top view)*

Figure 5

CONTAINERS FOR PRESSURIZING A LIQUID AND METHODS OF USE THEREOF

FIELD OF THE INVENTION

The invention is directed to the field of pressurizable containers.

BACKGROUND OF THE INVENTION

Molecular hydrogen has been found to be of potential therapeutic use for a variety of diseases and injuries. For example, $H_2$ has been shown to have applications as a method for reducing wrinkles in the skin (*J. Photochem. Photobiol. B.* 2012; 106:24-33), treating atopic dermatitis (*Evid. Based Complement. Alternat. Med.* 2013; 2013: 538673), and as a post-treatment regimen for radiation therapies (*Biochem. J.*, 2012, 442(1); 49-56). Hydrogen rich water represents one way in which molecular hydrogen can be administered to subjects. Common electrolytic and base metal, e.g., alkaline or alkaline earth, methods of producing hydrogen-rich water typically result in an alkaline solution with a low $H_2$ concentration.

Creating ready-to-drink containers of hydrogen rich water has significant technical challenges. The commercial equipment often used to saturate water with $H_2$ gas in sufficient volumes is both expensive and largely ineffective. When this equipment is utilized, $H_2$ can be dissolved at a maximum concentration of 1.6 ppm at standard temperature and pressure (STP) conditions per Henrys law; to retain this concentration of $H_2$ for any period of time, the container cannot have any headspace. Even when no headspace is present, the level of $H_2$ in the container quickly falls to ~1 ppm and will continue to fall towards 0 ppm depending on the containment technology, level of headspace, and the initial concentration, as seen by other commercial products on the market. Some products retain almost no $H_2$ by the time they reach consumers. For example, the Japanese government recently evaluated consumer goods containing $H_2$ and found that most had no detectable level of $H_2$ present. (http[[://]]www.kokusen.go.jp/news/data/n-20161215_2.html).

Accordingly, there is a need for new containers that maximize the dissolved hydrogen concentration and maintain the concentration for an extended time period.

SUMMARY OF THE INVENTION

We have developed containers for pressuring an aqueous liquid with a gas to increase the concentration of the gas in the aqueous liquid. In one embodiment, the gas is $H_2$ which has potential therapeutic applications but is poorly soluble in water and will escape a liquid if there is any headspace. The container employs one or more moveable sections to reduce the accessible volume of the container, e.g., allowing gases such as $H_2$ to become supersaturated within an aqueous liquid.

In one aspect, the invention features a container capable of holding an aqueous liquid. The container includes a housing having a hollow chamber with a first end and a second end, with a longitudinal axis extending therebetween; a moveable section configured to reduce the accessible volume of the hollow chamber; and a liquid passageway fluidically connected to the hollow chamber.

In another aspect, the invention features a kit including a housing comprising a hollow chamber with a first end and a second end, with a longitudinal axis extending therebetween, a moveable section configured to reduce the accessible volume of the hollow chamber, and a liquid passageway fluidically connected to the hollow chamber; and a cover for sealing the chamber. In certain embodiments, the kit further includes an insert for housing dissolvable compositions and including a liquid permeable membrane, e.g., including metal mesh, paper, fabric, polymers, or a combination thereof, configured to permit liquid flow while retaining a solid composition. The insert may be configured to move freely within the container or to be releasably connected within the container. The insert may include metal, polymer, glass, or a combination thereof.

In certain embodiments of any aspect, the first or second end is sealed with a cover, e.g., configured to translate the moveable section. The moveable section may translate perpendicular to or along the longitudinal axis. The moveable section may be translated mechanically, electrically, pneumatically, hydraulically, or by a combination thereof. In further embodiments, the moveable section includes a gasket. The position of the moveable section may be releasably fixed. In further embodiments, the moveable section is resiliently connected to the container, or a resilient member is disposed between the moveable section and the container. Examples of resilient members are a spring, foam, elastomer, or sponge, or the resilient connection employs a spring, foam, elastomer, and sponge. In certain embodiments, the liquid passageway includes a tube or a nipple. In some embodiments of any aspect, the container further includes a sealable access port for accessing the interior of the container. A container may also include a retention structure for a gas-evolving composition. The retention structure holds the composition and allows liquid to contact it.

The hollow chamber of any aspect may be separated into two sub-chambers that are fluidically connected, e.g., wherein the two sub-chambers are releasably connected. In certain embodiments, the moveable section is configured to reduce the volume of one sub-chamber. The two sub-chambers may be connected by a first and a second one-way valve oriented oppositely. Examples of valves include a ball valve, diaphragm valve, swing valve, solenoid valve, and a combination thereof. In certain embodiments, the first and second one-way valves open at a threshold pressure or are user controlled. In an embodiment, one sub-chamber is inside the other sub-chamber. In this embodiment, the moveable section may be connected to a plunger in the inner sub-chamber.

In further embodiments, the container or kit further includes an interior liner, e.g., including a flexible polymer. In some examples, the moveable section is configured to press against the interior liner.

In another aspect, the invention features a method for pressurizing an aqueous liquid by providing a container or kit of the invention; inserting into the hollow chamber an aqueous liquid and a gas-evolving composition, wherein gas evolves from the gas-evolving composition; and forcing evolved gas back into the aqueous liquid. The forcing may include reducing the headspace above the aqueous liquid in the hollow chamber by translating the moveable section. The gas-evolving composition may or may not be held within an insert.

Definitions

As used herein, "accessible volume" refers to the interior volume of a chamber that any fluid present can access. Thus, reducing accessible volume reduces the volume of a chamber and pressurizes the chamber when sealed.

As used herein, "headspace" refers to the volume above a liquid housed within a container that is filled with gas.

As used herein, "resiliently connected" refers to an object connected to a material that when deformed by an external force can return towards its pre-deformation shape via a restoring force.

As used herein, "supersaturation" refers to increasing the concentration of a gas dissolved within a liquid beyond the STP (standard temperature and pressure) solubility.

BRIEF DESCRIPTION OF THE DRAWINGS

FIG. 4A shows an embodiment of an insert, and FIG. 4B shows an embodiment of an attachment system for the insert in FIG. 4A.

DETAILED DESCRIPTION OF THE INVENTION

The invention provides containers, kits, and methods for pressurizing a liquid, e.g., by reducing headspace above the liquid or reducing accessible volume within a container.

Containers of the invention are advantageous because they allow sufficient space for complete in situ gas evolution inside a sealed container. This allows for the maximum production of a gas, e.g., $H_2$ from a solid composition, e.g., an effervescent tablet. The containers of the invention are further advantageous in that they allow for the pressurization of a liquid with the gas, allowing for supersaturation of the liquid. The containers can also be designed to maintain pressure inside while liquid is dispensed, e.g., via drinking, to maintain a substantially constant concentration of gas during use.

By having a container with an adjustable headspace, supersaturated levels of a gas, e.g., $H_2$, can be achieved. These levels are considerably higher than can be achieved by addition of gas to an open container. Pressurized containers are able to retain dissolved gases for longer periods while also allowing for easier transport and shipping. Additionally, a container with minimal headspace is also advantageous in reducing the growth of aerobic microbial agents, enhancing the safety of dissolved gas containing beverage products.

Containers

In general, containers of the invention have at least one chamber for receiving a liquid and a gas that may be evolved inside the container. The containers also allow for a reduction in the accessible volume of a chamber to pressurize a liquid, typically by forcing gas in a headspace into the liquid. These functions may be carried out by a variety of configurations, e.g., as described herein.

Figure 1:
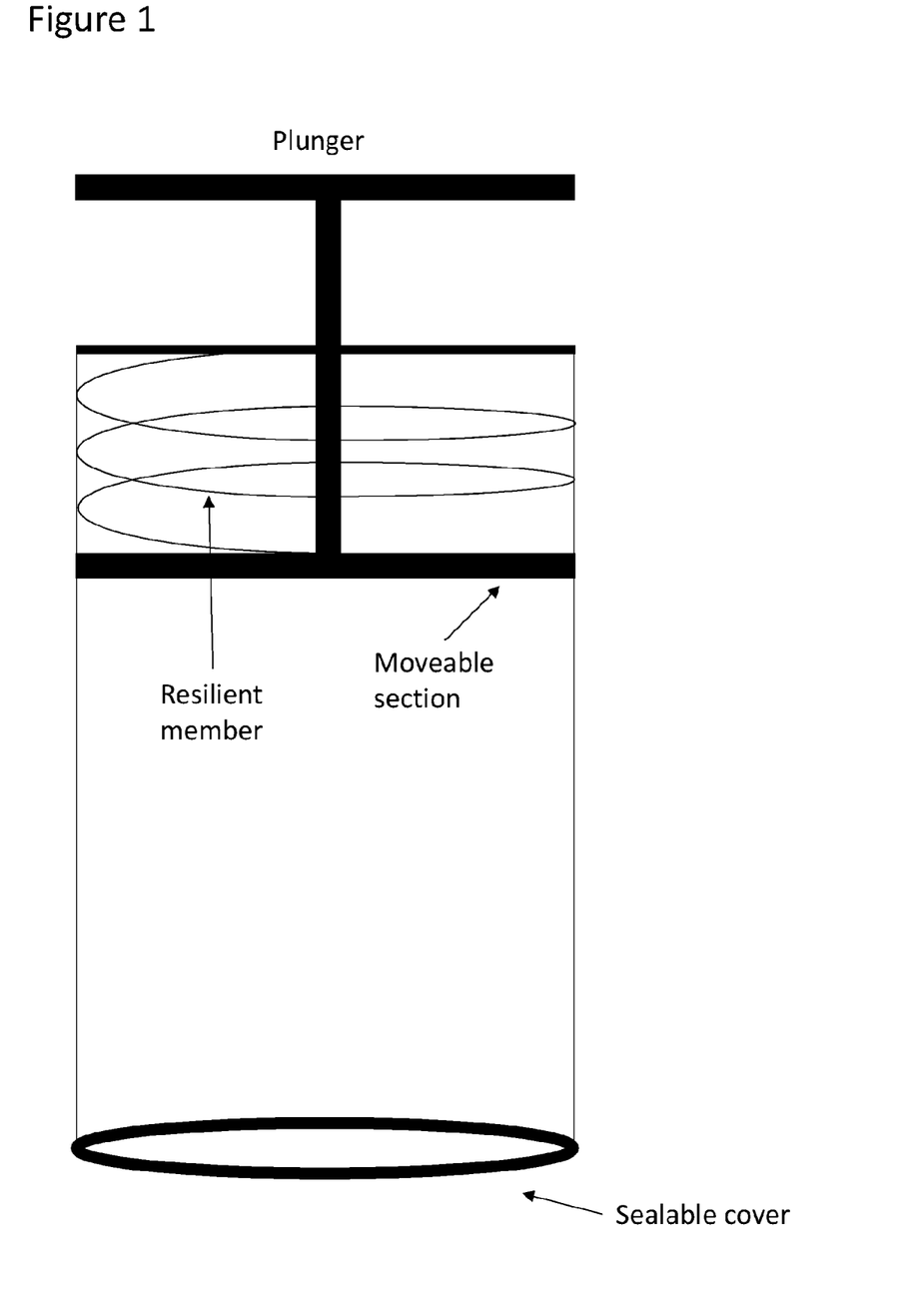
FIG. 1: Schematic view of an embodiment of a container of the invention having a chamber with a moveable section configured to reduce the accessible volume of the container.

A container of the invention includes a housing having a hollow chamber with a first end and a second end. The first and second ends define a longitudinal axis extending therebetween. Containers of the invention include a moveable section that is configured to move within the container, e.g., either along the longitudinal axis or substantially perpendicular to it, to reduce the accessible volume of the hollow chamber. An example of a container with a moveable section that translates along the longitudinal axis is shown in FIG. 1. Containers of the invention may be of any suitable material, shape, or thermal control ability (e.g., double walled or insulated) such that the material is able to hold pressure without leaking. Example container materials include, but are not limited to, metals (e.g., stainless steel or aluminum), polymers (e.g., polyethylene terephthalate (PET)), glass, or combinations thereof.

Containers of the invention can have the first end and/or second end sealed by a releasable cover, or an end may be permanently sealed. Covers for a container can be attached using standard mating features, including friction fit, screw threads, clamps, bayonet fitting, and grooves. Covers can be made of any suitable material, including, but not limited to, metals, polymers, glass, or a combination thereof such that the combination of the material and mating features are sufficient to maintain pressure upon sealing the container. Additionally, the covers may be configured to control the motion of a moveable section of the container by acting as an attachment location. Alternatively, the motion control for a moveable section may be integrated into the exterior of the container.

Figure 2:
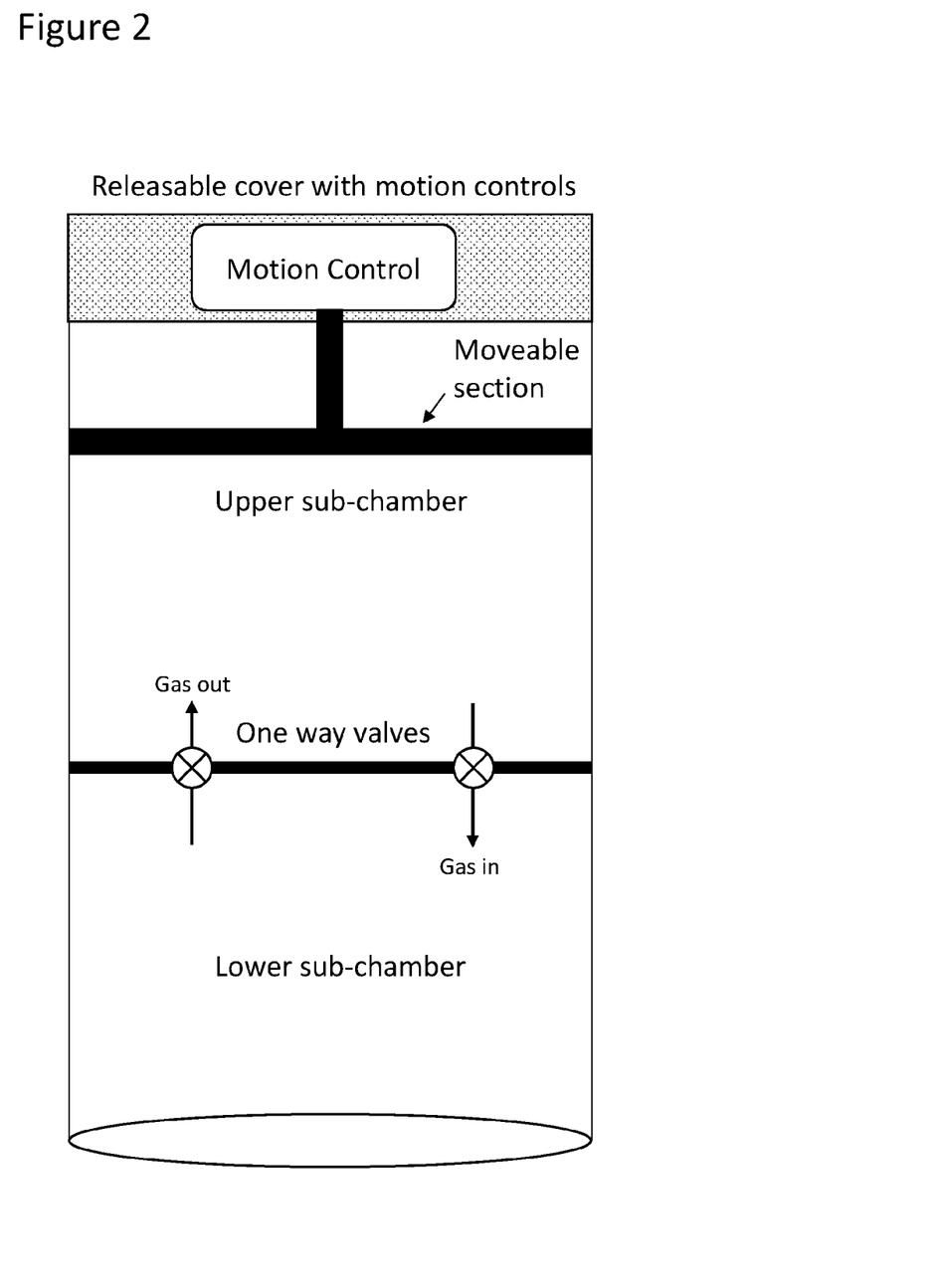
FIG. 2: Schematic view of an embodiment of a container of the invention having two sub-chambers configured to be joined together and connected by two one-way valves with their flow directions opposite one another. Also shown is a moveable section configured to reduce the accessible volume of one of the sub-chambers using an exemplary motion control mechanism.
Figure 5:
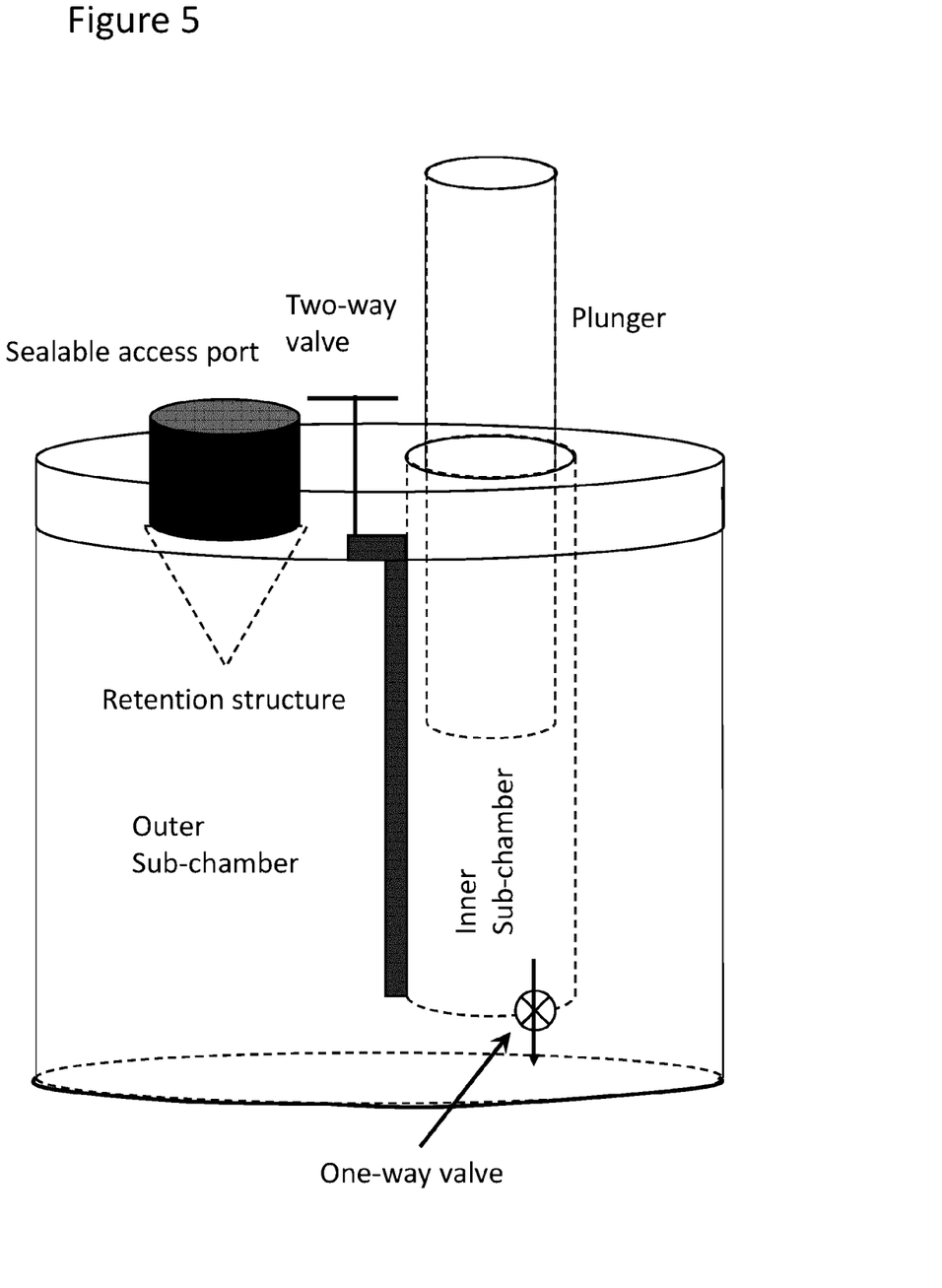
FIG. 5: Schematic view of an embodiment of a container of the invention having two sub-chambers where one sub-chamber is inside the other sub-chamber. A plunger is moveable to reduce the accessible volume of one sub-chamber.

In certain embodiments of the invention, such as that shown in FIGS. 2 and 5, a container may have a hollow chamber further divided into two sub-chambers. These sub-chambers are fluidically connected, e.g., by one-way valves. For example, the sub-chambers may be connected by two one-way valves that have flow directions opposite one another such that fluid and/or gas from that sub-chamber only flows to the other sub-chamber with no back fill to the original sub-chamber when pressure is applied to one sub-chamber. Alternatively or in addition, the sub-chambers may be fluidically connected via an opening, e.g., an orifice or aperture, or through one or more tubes or channels, so that fluid can move between the sub-chambers. Sub-chambers may also be connected by a two-way valve or a combination of a two-way valve and a one-way valve. For example, the container of the invention shown in FIG. 5 have two sub-chambers that are fluidically connected via a channel that is closeable by a valve and a one-way valve. The embodiment shown in FIG. 2 has the two sub-chambers fluidically connected using oppositely disposed one-way valves. Additionally, each sub-chamber may contain a moveable section for reducing the accessible volume of that sub-chamber, or, alternatively, only one sub-chamber can have a moveable section. The sub-chambers can be connected together using standard mating features, including friction fit, screw threads, clamps, bayonet fitting, and grooves capable of holding pressure. In certain embodiments, one sub-chamber is disposed within another sub-chamber, as shown in FIG. 5.

In any of the various embodiments, the container may contain a pressure relief system to prevent over-pressurizing the container. The pressure relief system may be a valve, such as a relief valve, safety valve, or rupture disk configured to rupture at a pre-determined pressure. Other pressure relief systems are known in the art. In some cases, a container of the invention may include a mechanism for monitoring the pressure within the sealed container, such as a pressure gauge, e.g., a mechanical pressure gauge, e.g., a Bourdon gauge.

Valves useful for controlling flow between sub-chambers in the present invention include one-way valves (i.e., gas or fluid can only move through the valve in a single direction and not in the reverse direction). The valves can be operated manually, electronically, or can be chosen to open when a threshold pressure is reached, then close when the pressure falls below the threshold value. Exemplary one-way valves for the invention include, but are not limited to, ball valves, diaphragm valves, swing valves, and solenoid valves.

Containers of the invention may have a liquid passageway that is fluidically connected to the hollow chamber to remove liquid from the container. The liquid passageway may be integrated into the exterior of the container, such as the container shown in FIG. 3. A liquid passageway, such as a tube, can further be integrated into a cover for the first end or second end of a container. Alternatively, a nipple can be used as a liquid passageway for the removal of liquid from a container and can further be used in conjunction with a tube or other style of liquid passageway known in the art. In other embodiments, the liquid passageway is an opening created when a cover is removed. In some cases, the cover of the container may contain a sealable access port, e.g., to allow access to the interior of the container without having to remove the releasable cover. The sealable access port may be sealed using a plug or similar fitting sized to the opening of the sealable access port. The plug may mate to the sealable access port using standard mating features, including friction fit, screw threads, clamps, bayonet fitting, and grooves. For example, a plug with screw threads to seal the access port is shown in FIG. 5. The container may also include a retention structure, such as a mesh, for holding a gas-evolving composition while it evolves gas. The retention structure may be located so that it is accessible from a sealable access port.

Containers of the invention may be lined, e.g., with a material other than that used in the housing. For example, the walls of a chamber may, in full or in part, be made of a flexible material, e.g., a plastic, that allows for deformation to reduce the accessible volume.

Moveable Section

The containers of the invention employ a moveable section for reducing the accessible volume of the chambers(s) of the containers. The moveable section may be configured to translate, e.g., along or perpendicular to the longitudinal axis to reduce the accessible volume of the chamber. The moveable section may be a wall of a chamber or part of a wall of a chamber. Alternatively, the moveable section can compress one or more walls of the container (either reversibly or irreversibly) to reduce the accessible volume. The moveable section may be shaped to contour to either the longitudinal dimension of the container or the latitudinal dimension of the container. The reduction has the effect of forcing gas in the headspace of the container back into the aqueous liquid within the container. Containers may have a moveable section such as the container shown in FIG. 1, or alternatively, may have multiple moveable sections. For example, in a container that has two sub-chambers such as the container shown in FIG. 2, each sub-chamber may have a moveable section, or the container as a whole may have a moveable section in one of the two sub-chambers, e.g., as shown in FIG. 5.

In certain embodiments, the position of the moveable section may be releasably fixed within the housing (i.e., the moveable section cannot move once secured), such that it can resist motion from the force of gases pushing back on the moveable section. Examples of mechanisms to secure the position of the moveable section include, but are not limited to, screw, tension-based collets, clamps, or combinations thereof. When the moveable section is a bladder, the moveable section may be secured by a valve. Other mechanisms for securing the position of the moveable section are known in the art.

An exemplary moveable section that forms a mechanical seal within a container is a gasket. Gaskets can be formed into the shape of the container and can be made of any suitable material, including but not limited to, cork, silicone, natural or synthetic rubber, neoprene, polytetrafluoroethylene (PTFE, e.g., TEFLON™), and nitrile. Other gasket materials are known in the art. Alternatively, the moveable section may be made from one material, e.g., the same material as the container, but have its outer perimeter include a gasket material as defined herein.

The moveable section may include a bladder, e.g., toroidal, cylindrical, or one-sided, or other flexible structure. For example, when the chamber includes a flexible portion, a bladder can be inflated, e.g., by mouth or using a pump, to press into the flexible portion and reduce the accessible volume. In another example, the moveable section mechanically constrains a flexible chamber or portion thereof. This mechanical constraint can occur by hand press, an iris, or similar mechanism. A mechanically constrained moveable section can be designed to be deformed into a specific configuration by pressing into it. For example, the moveable section can be segmented in a manner such that it changes shape in response to an applied pressure. Alternatively, the accessible volume of a flexible chamber can be reduced by applying reduced pressure to the inside of the chamber, e.g., by suction of the liquid contents by a user.

The invention also provides containers including a lid and a bottom portion. The bottom portion includes a bottom and side walls, and the lid contains the mechanisms for increasing and relieving pressure, e.g., as shown in FIG. 5. Such containers may be advantageous in ease of cleaning.

Motion Controls

In order for the accessible volume of the container to be reduced, a moveable section must be operatively connected to an actuator for applying sufficient force to move the moveable section. In certain embodiments, a moveable section may be translated, expanded, or reshaped using any type of force, e.g. mechanical, electrical, pneumatic, or hydraulic. For example, a moveable section may be attached to a shaft which can be linearly translated within the container by the user, e.g., either manually or using a motor. For example, as shown in FIG. 5, the moveable section, e.g., a plunger with a gasket, may be pushed down by the operator to force any evolved gas, e.g., $H_2$, into the liquid within the container. Electrical actuators useful for translating a moveable section of a container of the invention include electric motors such as linear translators or stepper motors. Other electric motors that provide linear translation are known in the art. The moveable section may also be translated by using an electromagnet. Linear motion may also be achieved using a hydraulic piston having a working arm connected to the moveable section. When the fluid in the piston body is increased or decreased, the working arm moves accordingly, translating the moveable section longitudinally within the container. Alternatively, the moveable section may be translated using pneumatics, such as an air piston or a bladder disposed on the appropriate side of the moveable section. For example, a bladder can be inflated or deflated by mouth or a pump, and as it expands, the moveable section is translated in the direction of the expansion. Alternatively, the moveable section may be compressed into collapsible, e.g., telescopic, e.g. scissor, or folded, e.g., concertina, sections, such that it can be raised or lowered without the need for a mechanical shaft. In any of the above actuators for translating a moveable section, the control can be manually set or performed automatically based on a pre-set threshold.

In some embodiments, the container has a translatable moveable section for reducing the volume of the container. The translation of the moveable section may be controlled by the motion control as described herein. Additionally or alternatively, the moveable section may be resiliently connected by a material that is capable of providing a restoring force (i.e., when compressed, the material returns to its equilibrium position by providing an equivalent force in the opposite direction of the externally applied force), or the container or moveable section may be connected to a resilient member or a resilient member may otherwise be disposed between the moveable section and the container. This externally applied force may result from the expansion of gas within the container. An example of a container with a moveable section having both a motion control and a resilient member is shown in FIG. 1. Suitable resilient member materials have a Young's modulus sufficient to allow the material to respond to a compressive load without being overly difficult to compress. Examples of suitable resilient member materials include, but are not limited to, springs, foams (e.g., urethane), elastomers, and sponges. Other resilient member materials are known in the art.

Accessible volume reduction may by motion external or internal to the chamber. For example, a motion control may physically press a moveable section into a chamber or may pull a moveable section from inside the chamber. Similarly, bladders or other flexible moveable sections can be moved by an increase or decrease of pressure.

Insert

Figure 4A:
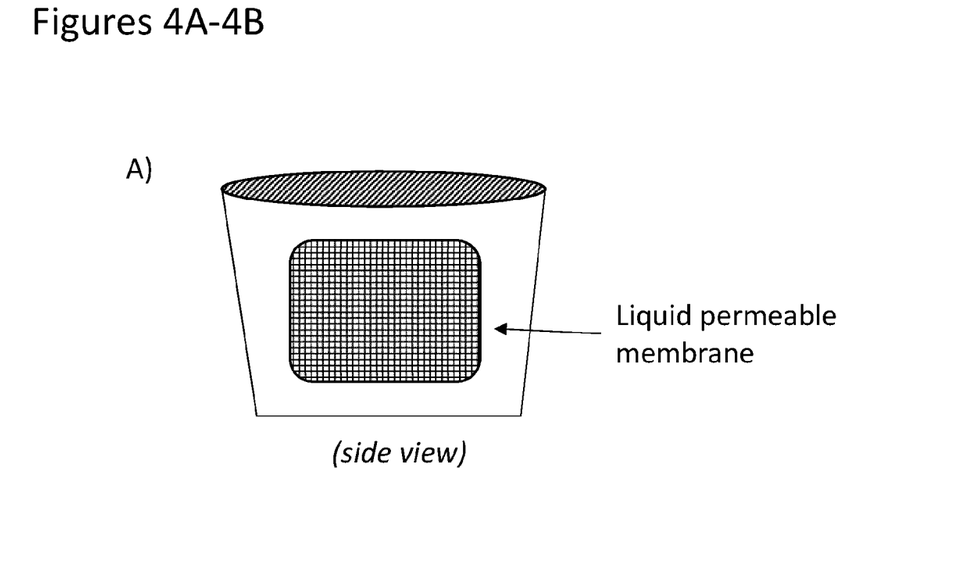
FIGS. 4A-4B: Schematic views of an embodiment of an insert with an outer housing and liquid permeable membrane and an example of an insert attachment system configured to be placed within a container of the invention.

The invention provides an insert for housing an aqueous liquid-soluble solid composition which produces a gas while dissolving, e.g., a powder. An example of an insert is shown in FIG. 4A. The insert may have a liquid permeable membrane, e.g., a mesh, that permits liquid flow while retaining a solid composition within. The liquid permeable membrane allows the composition to dissolve and gas that evolves from the composition to escape. Alternatively, the insert may be solid and then pierced to allow liquid to enter and gas to escape. The insert is configured to be placed within a container filled with an aqueous liquid. The insert may be allowed to move freely within the container or alternatively, may be configured to be secured to an interior wall of the container using a releasable attachment mechanism, with an embodiment shown in FIG. 4B. For example, the insert can be releasably attached to a hook or track system within the container. Other releasable attachment mechanisms for securing objects to one another are known in the art. The insert may further be configured to be a consumable item for a single use. Alternatively, the insert may be a reusable item.

A liquid permeable membrane material is configured to allow aqueous liquids and evolved gases to escape while having sufficiently small pores for retaining solid compositions. Liquid permeable membrane materials useful for the invention include, but are not limited to, metal meshes, natural paper fibers (e.g., cellulose or lignin), fabrics (e.g., cotton or linen), polymers (e.g., polyester, PTFE, or polyamide), or combinations thereof. Other liquid permeable membrane materials are known in the art. The membrane material may be substantially non-degradable. Alternatively, the membrane material may be degradable with varying kinetics in order to control the evolution of gas from a solid composition. Inserts with liquid permeable membranes may further include seals, e.g., foils, covering the membranes that are removable prior to use.

The insert may be made of any suitable material which resists degradation in aqueous fluids. Example materials used to make the insert include, but are not limited to, metals, polymers (e.g., PET), glass, or a combination thereof. Other suitable materials are known in the art.

Methods of Use

The invention features methods for pressurizing an aqueous liquid held within a container with a gas also present in the container. In particular, the invention provides a method for reducing the headspace of a liquid within the container using a system of one or more moveable sections within the container upon the dissolution of a gas-evolving solid composition.

An exemplary use for the containers of the invention is for producing a supersaturated solution of molecular hydrogen ($H_2$) within a consumable beverage. $H_2$ can be produced in an aqueous solution through the dissolution of a solid composition as is known in the art, for example, in U.S. Pat. No. 9,144,581, which is incorporated herein for reference. $H_2$ is poorly soluble in aqueous liquids, having a solubility of 0.8 mM, equating to 1.8 ppm at room temperature. Furthermore, when stored in a container, dissolved $H_2$ will escape the liquid through any headspace within the container.

In one embodiment of the invention, a container of the invention is filled with an aqueous liquid and a solid composition which produces a gas, e.g., $H_2$. The composition may be an effervescent tablet, such as those previously described in the art referenced herein, or, optionally, can be a loose powder to be contained within an insert described herein. As the solid composition dissolves and $H_2$ is evolved, the $H_2$ fills the headspace above the liquid in the container. The accessible volume of the container is reduced by applying a suitable force to translate one or more moveable sections in the container towards the liquid, thereby forcing evolved $H_2$ gas into the liquid and supersaturating it.

EXAMPLES

Example 1

FIG. 1 shows an example of a container of the invention with a moveable section. The moveable section is connected to a shaft such that it can be translated down on top of the liquid, and the moveable section and shaft are integrated into an end of the exterior of the container. The other end of the container has a double gasketed cap. The position of the moveable section can be held in place by tightening a compression fitting at the point where the shaft passes through the exterior of the container or by a twist lock mechanism.

The moveable section is connected to the shaft such that the position of the moveable section can be changed along the longitudinal axis of the container and shaft. Furthermore, the moveable section is separated from the end of the container by a resilient member that is able to compress upon application of an applied force, e.g., pressure increase due to evolving gas within a closed system.

The container in FIG. 1 is filled with an aqueous liquid and a composition that produces a gas, such as $H_2$, and sealed with the cover. As the composition dissolves, gas is produced, and the force of the expanding gas pushes on the moveable section, causing it to move against the resilient member and increase the accessible volume of the container, thus creating headspace above the liquid in the container. After the composition has ceased producing gas, the moveable section is then pushed down using the shaft to force the gas in the headspace back into the liquid. The moveable section is stopped against the surface of the liquid, and the position can be locked down not to allow gas to escape from the liquid. The cover can be removed to access the liquid or the container can include a valved tube or nipple to access the liquid.

Example 2

FIG. 2 provides an example of a container of the invention that has two sub-chambers, an upper sub-chamber and lower sub-chamber, connected together in the middle. At the separation plane between the two sub-chambers, the container has two one-way valves that have flow directions oriented opposite one another. In this configuration, the upper sub-chamber contains a moveable section to reduce the accessible volume of that sub-chamber. The cover of the container in FIG. 2 contains a motorized mechanism for moving the moveable section within in the upper sub-chamber and also contains the necessary power and circuitry to operate the motorized motion control.

The lower sub-chamber of the container in FIG. 2 is filled with an aqueous liquid and a composition that produces a gas, such as $H_2$, and is sealed to the upper sub-chamber. As the composition dissolves and produces gas in the lower sub-chamber, the pressure builds in the lower sub-chamber. The one-way valve with the flow direction pointing towards the upper chamber opens to allow the evolved gas to fill the upper sub-chamber. The first one-way valve may be opened, e.g., at a threshold pressure, manually by the user, or opened electronically by on-board circuitry. When the composition has ceased producing gas, the one-way valve that allowed the upper chamber to be filled closes, and the other one-way valve opens to allow gas to be forced into the lower sub-chamber. The second one-way valve may also be opened at a threshold pressure, manually by the user, or opened electronically by on-board circuitry. The moveable section is translated down the upper sub-chamber using the motorized motion control such that any gas in the upper sub-chamber is forced into the lower sub-chamber through the second one-way valve and into the aqueous liquid contained in the lower sub-chamber. The cover can be removed to access the liquid or the container can include a valved tube or nipple to access the liquid.

Example 3

Figure 3:
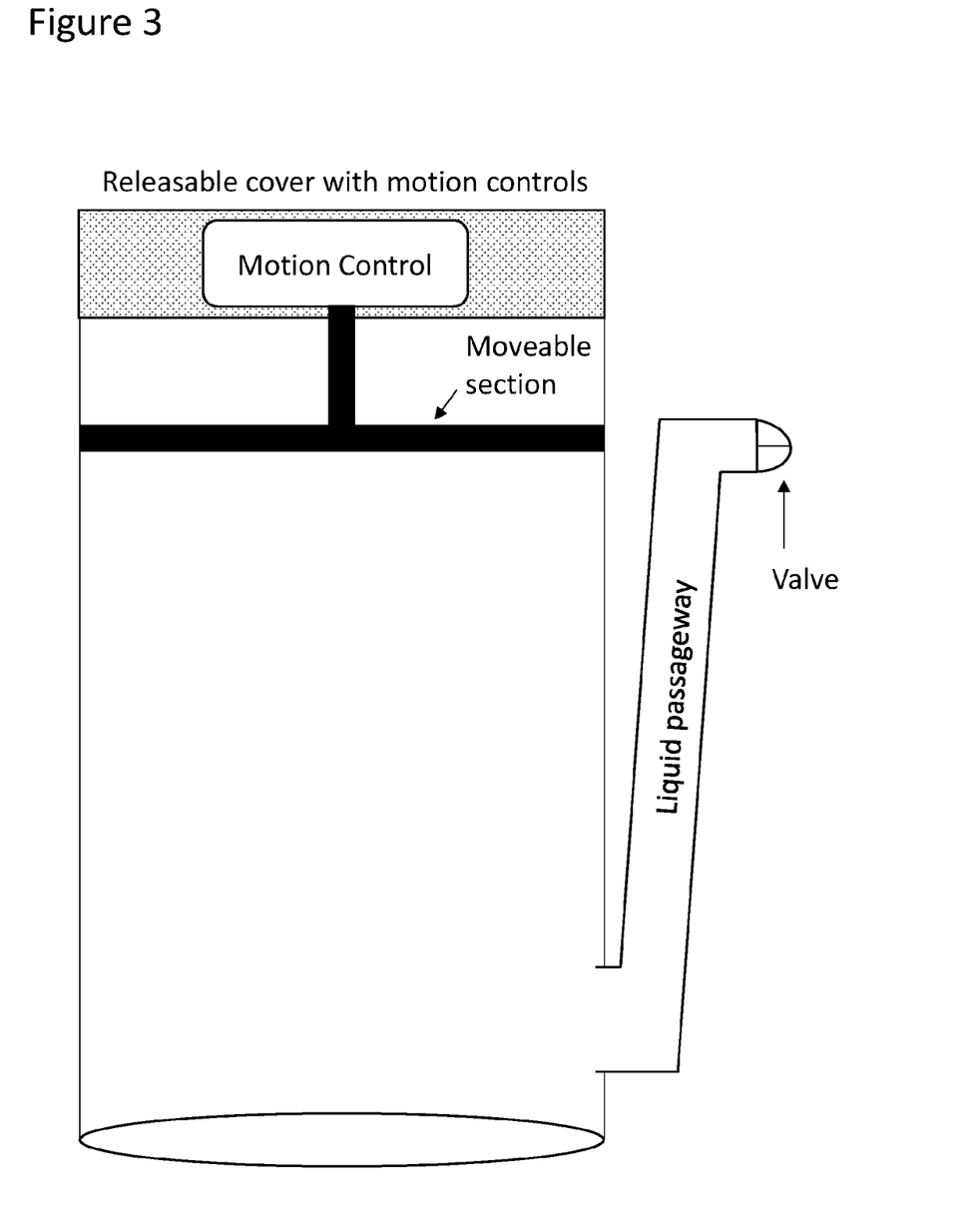
FIG. 3: Schematic view of an embodiment of a container of the invention having a hollow chamber with a fluidically connected, sealable liquid outlet. Also shown is a moveable section configured to reduce the accessible volume of the container using an exemplary motion control mechanism.

FIG. 3 shows an example of a container used for pressuring a liquid with a gas in a container that has a moveable section controlled using a motion control system and has a liquid passageway fluidically connected to the bottom of the container. The liquid passageway may be permanently integrated into the container or releasable. In this configuration, the moveable section is connected to the motion control system, which is integrated into the cover for the container. The external end of the liquid passageway has a valve such that liquid can be drawn from the container through the liquid passageway.

The container in FIG. 3 is filled with an aqueous liquid and a composition that produces a gas, such as $H_2$, and the cover containing the moveable section and motion control system is attached to seal the container. As the composition dissolves and produces gas, the gas fills the headspace of the container above the liquid. When the composition has ceased gas production, the motion control system is engaged to force the gas back into the liquid using the moveable section, producing a supersaturated aqueous liquid.

As liquid is drawn from the container, the headspace increases, thereby allowing evolved gas to escape the liquid. To prevent this, the motion control system is configured to translate the moveable section further down the container, allowing the liquid to be re-pressurized with gas and thereby maximizing the concentration of gas within the aqueous liquid.

Example 4

Figure 4B:
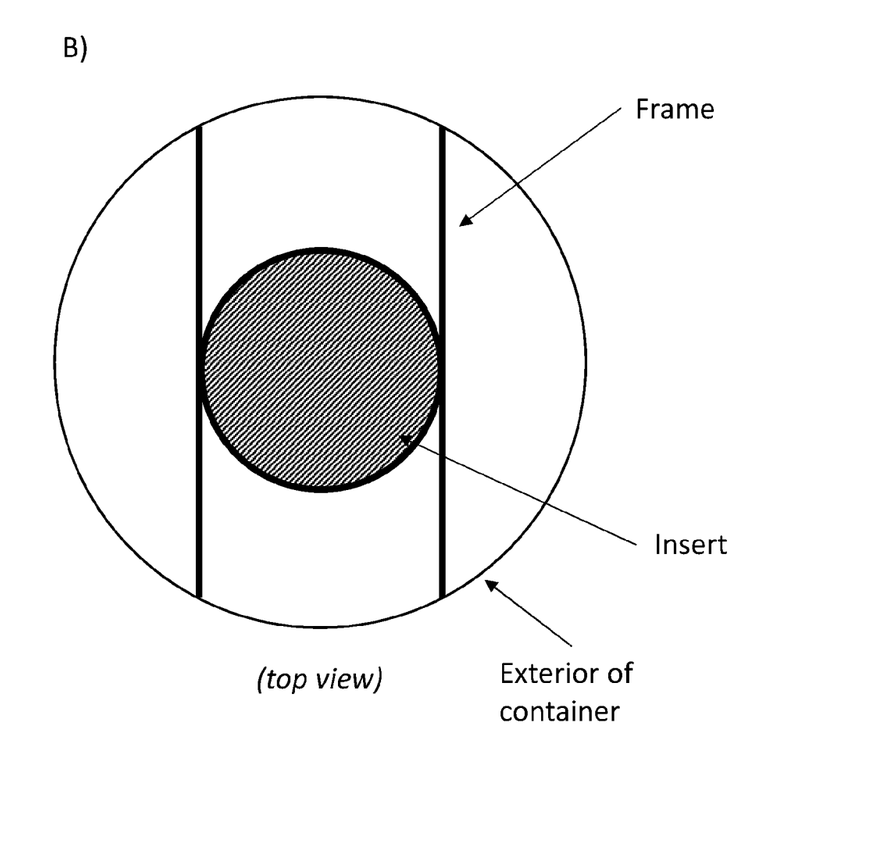

FIGS. 4A and 4B show example embodiments of an insert for holding a gas-evolving solid composition and a system to secure the insert within a container of the invention. FIG. 4A shows an insert having a solid outer housing and liquid permeable membranes made of a mesh material. For example, the mesh material can be stainless steel, brass, fabric, e.g., cheesecloth, or other similar material. In the example, the top of the insert is releasable such that the insert can be filled with an amount of solid composition. FIG. 4A shows a round opening for the insert and a tapered cylindrical body.

The liquid permeable membranes are configured such that aqueous liquids can pass through them to contact the solid composition within the insert, facilitating complete dissolution. The liquid permeable membranes are also gas permeable such that all evolved gas from the solid composition can escape into the aqueous liquid.

FIG. 4B shows an example of a securing mechanism for holding the insert within the container. The system as shown in the example provides a frame to be physically connected to the inside of the container which has the shape of the insert. The insert is designed to be placed into this frame and lock into place such that it is largely immobilized, allowing for complete dissolution of the solid composition within the insert to occur.

Example 5

FIG. 5 shows a container of the invention that includes a removable cover that has a sealable access port, a retention structure, and a mechanically-actuated moveable section connected to a plunger. The container includes two sub-chambers, an inner sub-chamber and an outer sub-chamber. The sub-chambers are fluidically connected by a one-way valve and a channel controlled by a two-way valve. The one-way valve allows flow from the inner to the outer sub-chamber. The channel and two-way valve could be replaced with a one-way valve that allows flow from the outer to the inner sub-chamber. The container may also include a pressure relief valve to allow the device to be depressurized prior to opening for consumption of the liquid.

To operate the container, the plunger is inserted into the inner sub-chamber. Liquid, e.g., water, is added via the sealable access port. Air can be purged from the inner sub-chamber by pulling out the plunger with the two-way valve open, and then pushing in the plunger with the two-way valve closed. A gas-evolving composition can then be placed in the retention structure, and the sealable access port is closed. With the two-way valve open, gas evolves, and the increase in pressure forces the plunger out of the inner sub-chamber.

Once the gas-evolving composition has ceased producing gas, the two-way valve is closed, and the plunger is pushed down, forcing the contents of the inner sub-chamber into the outer sub-chamber and increasing the pressure inside the container. The increased pressure allows the gas to supersaturate the liquid in the outer sub-chamber. Once supersaturated, pressure is released, either by opening the sealable access port or by opening a separate pressure relief valve. At this point, the liquid can be consumed.

Other embodiments are in the claims.

What is claimed is:

1. A container capable of holding an aqueous liquid, comprising:
    a) a housing comprising a hollow chamber with a first end and a second end, with a longitudinal axis extending therebetween;
    b) a moveable section configured to reduce an accessible volume of the hollow chamber; and
    c) a liquid passageway fluidically connected to the hollow chamber;
    wherein the hollow chamber is separated into two sub-chambers that are fluidically connected; and (i) wherein the two sub-chambers are connected by a first one-way valve and a second one-way valve oriented oppositely or (ii) wherein the two sub-chambers comprise an inner sub-chamber and an outer sub-chamber and the inner sub-chamber is disposed inside the outer sub-chamber.

2. The container of claim 1, wherein the first or second end is sealed with a cover.

3. The container of claim 2, wherein the cover is configured to translate the moveable section.

4. The container of claim 1, wherein the moveable section translates perpendicular to the longitudinal axis or wherein the moveable section translates along the longitudinal axis.

5. The container of claim 1, wherein the two sub-chambers are releasably connected with one or more mating features.

6. The container of claim 1, wherein the moveable section is configured to reduce the volume of one sub-chamber.

7. The container of claim 1, wherein the two sub-chambers comprise the inner sub-chamber and the outer sub-chamber, and the moveable section is connected to a plunger in the inner sub-chamber.

8. A method for pressurizing an aqueous liquid, comprising:
    a) providing a container of claim 1;
    b) inserting into the hollow chamber an aqueous liquid and a gas-evolving composition, wherein gas evolves from the gas-evolving composition; and
    c) forcing evolved gas back into the aqueous liquid.

9. The method of claim 8, wherein step (c) comprises reducing a headspace above the aqueous liquid in the hollow chamber by translating the moveable section.

10. A kit comprising:
    a) a housing comprising a hollow chamber with a first end and a second end, with a longitudinal axis extending therebetween, a moveable section configured to reduce an accessible volume of the hollow chamber, and a liquid passageway fluidically connected to the hollow chamber;
    b) a cover for sealing the chamber; and
    c) an insert for housing dissolvable compositions comprising a liquid permeable membrane configured to permit liquid flow while retaining a solid composition.

11. The kit of claim 10, wherein the moveable section translates perpendicular to the longitudinal axis or wherein the moveable section translates along the longitudinal axis.

12. The kit of claim 10, wherein the cover is configured to translate the moveable section.

13. The kit of claim 10, wherein the hollow chamber is separated into two sub-chambers that are fluidically connected.

14. The kit of claim 13, wherein the two sub-chambers are releasably connected and/or wherein the moveable section is configured to reduce the volume of one sub-chamber and/or wherein the two sub-chambers are connected by a first one-way valve and a second one-way valve oriented oppositely.

15. The kit of claim 14, wherein the two sub-chambers are connected by the first one-way valve and the second one-way valve, and the first one-way valve and the second one-way valve open at a threshold pressure or are user controlled.

* * * * *